(12) United States Patent
Wingender et al.

(10) Patent No.: US 12,523,278 B2
(45) Date of Patent: Jan. 13, 2026

(54) ACTUATING UNIT, BRAKE BOOSTER, VEHICLE BRAKE SYSTEM AND SUBASSEMBLY THEREFOR

(71) Applicant: ZF Active Safety GmbH, Koblenz (DE)

(72) Inventors: Kurt Wingender, Hartenfels (DE); Daniel Schwarz, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 722 days.

(21) Appl. No.: 17/892,218

(22) Filed: Aug. 22, 2022

(65) Prior Publication Data
US 2023/0055504 A1     Feb. 23, 2023

(30) Foreign Application Priority Data
Aug. 20, 2021   (DE) .......................... 102021121700.8

(51) Int. Cl.
*F16H 19/04*   (2006.01)
*B60T 13/74*   (2006.01)
*F15B 15/20*   (2006.01)

(52) U.S. Cl.
CPC ............ *F16H 19/04* (2013.01); *B60T 13/745* (2013.01); *F15B 15/20* (2013.01); *F15B 2015/206* (2013.01)

(58) Field of Classification Search
CPC ...... B60T 13/146; B60T 13/168; B60T 8/441; B60T 13/166; B60T 8/366; B60T 13/745;
(Continued)

(56) References Cited

U.S. PATENT DOCUMENTS 6,564,692 B2 *   5/2003   Inoue .................... B60T 13/575
                                                                   91/369.3
6,672,198 B2 *   1/2004   Friedsam ................ B60T 13/72
                                                                   91/367
(Continued)

FOREIGN PATENT DOCUMENTS

DE         19902710 A1    11/1999
DE         19835772 A1 *   2/2000   .............. B60T 13/57
(Continued)

*Primary Examiner* — Robert A. Siconolfi
*Assistant Examiner* — Mahbubur Rashid
(74) *Attorney, Agent, or Firm* — Kristin L. Murphy (57) ABSTRACT

An actuating unit for a brake booster of a vehicle is disclosed, the actuating unit having a housing and a force transmission module which is received displaceably in the housing. The force transmission module has a first force transmission element, a second force transmission element which is couplable or coupled to the first force transmission element so as to transmit force, a spring device which is couplable or coupled to the second force transmission element so as to transmit force and an actuating element which is couplable or coupled to the first force transmission element. The spring device is configured to exert a spring force on the first and/or second force transmission element such that the first and/or second force transmission element is able to be held at least temporarily in a predetermined initial position. The first and/or second force transmission element is adjustable from the initial position counter to the spring force of the spring device by an adjustment path by a force exerted and/or transmitted onto the first force transmission element. The force transmission module is configured to decouple the first force transmission element from the spring device after a defined adjustment path, as well as a brake booster, vehicle brake system and subassembly therefor.

16 Claims, 6 Drawing Sheets

(58) Field of Classification Search
CPC .. F15B 20/004; F15B 15/20; F15B 2015/206; F16H 19/04
See application file for complete search history.

(56) References Cited

U.S. PATENT DOCUMENTS

| | | | |
|---|---|---|---|
| 6,843,161 B2 * | 1/2005 | Schluter | B60T 13/72 |
| | | | 91/369.2 |
| 7,201,456 B2 * | 4/2007 | Bacardit | B60T 8/3275 |
| | | | 91/369.3 |
| 8,029,073 B2 * | 10/2011 | Attard | B60T 13/565 |
| | | | 303/114.3 |
| 9,260,097 B2 * | 2/2016 | Calvo Martinez | B60T 13/57 |
| 2002/0069751 A1 * | 6/2002 | Inoue | B60T 8/3275 |
| | | | 91/376 R |
| 2016/0101767 A1 | 4/2016 | Charpentier et al. | |

FOREIGN PATENT DOCUMENTS

| | | | | |
|---|---|---|---|---|
| DE | 10054252 A1 * | 5/2002 | | B60T 13/52 |
| DE | 60207171 T2 | 7/2006 | | |
| DE | 19835772 B4 * | 11/2008 | | B60T 13/57 |
| DE | 102009045846 A1 * | 7/2010 | | B60T 13/575 |
| EP | 2379387 B1 * | 10/2012 | | B60T 13/575 |
| GB | 1438930 A * | 6/1976 | | B60T 13/143 |
| KR | 2008010810 A * | 1/2008 | | |
| KR | 2009004132 A * | 1/2009 | | |
| WO | 2014177691 A1 | 11/2014 | | |

* cited by examiner

ACTUATING UNIT, BRAKE BOOSTER, VEHICLE BRAKE SYSTEM AND SUBASSEMBLY THEREFOR

CROSS-REFERENCE TO RELATED APPLICATION

This application claims priority to German Patent Application No. 102021121700.8, filed Aug. 20, 2021, the disclosure of which is incorporated herein by reference in its entirety.

TECHNICAL FIELD

The disclosure relates to an actuating unit for a brake booster of a vehicle. The disclosure further relates to a brake booster. The disclosure also relates to a vehicle brake system and a subassembly for a vehicle brake system.

BACKGROUND

Vehicle brake systems often have electromechanical brake boosters (electronic brake booster, EBB, EBB-actuators) or pneumatic brake boosters. Electromechanical brake boosters are driven by electric motors, wherein the rotational movement of the output shaft of the electric motor is converted into a translatory movement in order to be able to generate a boost to the brake force by the brake booster. Pneumatic brake boosters have pneumatic servo motors with adjustable pistons. Springs are often used for restoring a piston or a force transmission element into its initial position. In the case of a malfunction or emergency braking process, a mechanical coupling can be carried out by a push-through device (PT system). Various devices for this purpose are known from the prior art.

For example, WO 2014/177691 A1 discloses a brake system with a master cylinder and electrical servo brake, with a transmission of the movement of the electrical motor to a thrust rod of the master cylinder by two mechanisms, which are symmetrical relative to the axis of the system, for transmitting the movement of the electric motor to two toothed racks of a body of the electrical servo brake.

However, it has been shown that, for example, during a push-through mode, the driver not only has to apply the hydraulic pressure with the foot for decelerating the vehicle but additionally has to compress the restoring spring of the brake booster, wherein with an increasing pedal path, the counter force caused by compressing the restoring spring increases. Ultimately, only a part of the foot force is used for the braking.

SUMMARY

What is needed is an improved actuating unit mentioned in the introduction as well as a brake booster mentioned in the introduction in terms of structure and/or function. Moreover, what is needed is an improved vehicle brake system mentioned in the introduction as well as a subassembly for a vehicle brake system in terms of structure and/or function.

An actuating unit can be for a brake booster. The brake booster can be for a vehicle. The brake booster can be an electromechanical brake booster or a brake booster operating by pneumatic negative pressure. The vehicle can be a motor vehicle. The motor vehicle can be a passenger motor vehicle or truck. The brake booster can be part of a hydraulic brake system of the motor vehicle.

The actuating unit can have a housing. The housing can have a housing element or a main housing. The housing can be a housing element or a main housing of the brake booster. The brake booster can have the housing. The housing can be cylindrical. The housing can have, for example, a substantially cylindrical recess and/or bore. The recess and/or bore of the housing can extend in the direction of the longitudinal axis.

The actuating unit can have a force transmission module. The force transmission module can be received or is received displaceably in the housing. The force transmission module can be arranged, for example in some sections, in the housing. The force transmission module can be slidably received, for example in some sections, in the housing. The force transmission module can be arranged, for example displaceably and/or slidably, in the recess and/or bore of the housing.

The force transmission module can have a first force transmission element. The first force transmission element can be configured to be cylindrical and/or piston-shaped. The first force transmission element can have a sleeve-like or cylindrical shape. The first force transmission element can have an annular cross section. The actuating unit and/or the brake booster can have a force input member. The force input member can be configured to transmit an actuating force exerted by the driver on a brake pedal, for example during a push-through mode. The force transmission module and/or the first force transmission element can be couplable or coupled, for example couplable or coupled in an articulated manner, to the force input member. The force input member can be configured to transmit the actuating force exerted by the driver on a brake pedal, for example during a push-through mode, to the force transmission module and/or the first force transmission element. As a result, the force transmission module and/or the first force transmission element can be displaced, for example, inside the housing and/or counter to a force, such as a spring force, of a spring device and/or compression of a spring, such as a restoring spring. As a result, the actuating force exerted by the driver can be transmitted to a brake cylinder, such as a brake master cylinder.

The force transmission module can have a second force transmission element. The second force transmission element can be couplable or coupled to the first force transmission element so as to transmit force. The second force transmission element can be configured in a cylindrical and/or piston-shaped manner. The second force transmission element can have a sleeve-like or cylindrical shape. The second force transmission element can have an annular cross section. The first force transmission element and the second force transmission element can be displaceable together, for example at the same time. The first force transmission element and the second force transmission element can be displaceable relative to one another. The first force transmission element and the second force transmission element can be displaceable in the same direction. The first force transmission element can be displaceably received at least in some sections inside the second force transmission element. The first force transmission element and the second force transmission element can be displaced or are displaced into one another. The first force transmission element can be slidably received, for example in some sections, in the second force transmission element. The second force transmission element can have, for example, a substantially cylindrical recess and/or bore. The recess and/or bore of the second force transmission element can extend in the direction of the longitudinal axis. The first force transmission element can be arranged, for example displaceably and/or slidably received, in the recess and/or bore of the second force transmission element.

The force transmission module can have a spring device. The spring device can be couplable or coupled to the second force transmission element so as to transmit force. The second force transmission element can have a support section. The spring device can be couplable or coupled to the support section of the second force transmission element so as to transmit force. The spring device can have a first spring, such as a first restoring spring. The spring device can have a second spring, such as a second restoring spring. The first spring can be couplable or coupled to the support section of the second force transmission element so as to transmit force. The second spring can be couplable or coupled to the support section of the second force transmission element so as to transmit force. The first spring can have a first spring force-spring path characteristic curve. The second spring can have a second spring force-spring path characteristic curve. The first and second spring force-spring path characteristic curves can differ from one another. The first or second spring force-spring path characteristic curve can be, for example, a function of the spring force depending on a spring path of the first or second spring. The first spring can have and/or define a first spring force. The second spring can have or define a second spring force. The first spring force can be smaller or larger than the second spring force, for example with the same spring path.

The force transmission module can have an actuating element. The actuating element can be couplable or coupled to the first force transmission element. The actuating element can be received and/or arranged, for example displaceably and/or slidably, at least in some sections inside the first force transmission element. The first force transmission element and the actuating element can be displaced or are to be displaced inside one another. The first force transmission element can have, for example, a substantially cylindrical recess and/or bore. The recess and/or bore of the first force transmission element can extend in the direction of the longitudinal axis. The actuating element can be arranged and/or be received, for example displaceably and/or slidably, in the recess and/or bore of the first force transmission element.

The actuating element can be drivable and/or displaceable electrically, for example by a transmission, and/or pneumatically, for example by a piston and/or a piston arrangement. The actuating element can be configured to be cylindrical and/or piston-shaped. The actuating element can have a sleeve-like or cylindrical shape. The actuating element can have a ribbed structure at least in some sections. The ribbed structure can be of arcuate configuration. The ribbed structure can be configured in an arcuate manner in the direction of a circular arc about the longitudinal axis of the actuating element. The ribbed structure can have a plurality of ribs. The ribs of the ribbed structure can extend substantially parallel to the longitudinal axis of the actuating element. The ribs of the ribbed structure can extend in a direction substantially transversely, for example perpendicularly, to the longitudinal axis of the actuating element.

The actuating element can have at least one tooth row section. The at least one tooth row section can be couplable or coupled via a transmission to an electric motor. The transmission can be a spur gear which is driven by the electric motor and which is coupled to the at least one tooth row section. The rotational movement output by the electric motor can be converted by the tooth row section into a translatory movement of the actuating element. The at least one tooth row section can have driving teeth. The driving teeth can have an involute toothing, spur toothing or helical toothing. The at least one tooth row section can be a toothed rack section. The actuating element can be a toothed rack module. The actuating element can have, for example, a substantially cylindrical recess and/or bore. The recess and/or bore of the actuating element can extend in the direction of the longitudinal axis. The actuating element can have an annular cross section. The actuating element can have an inner face and an outer face in the radial direction. The actuating element can have longitudinal guides. The longitudinal guides can be arranged on the inner face. The at least one tooth row section can be arranged on the outer face.

The actuating element can have a single tooth row section. The actuating element can be designed as a single toothed rack module. The actuating element can have two tooth row sections. The actuating element can have a first tooth row section and a second tooth row section. The first tooth row section and the second tooth row section can be arranged diametrically opposite one another, for example relative to the longitudinal axis of the actuating element. The two tooth row sections can be arranged opposingly in a direction transversely, for example substantially perpendicularly, to the longitudinal axis of the actuating element. The actuating element can be designed as a double toothed rack module. Each tooth row section of the actuating element can be brought into engagement or can be in engagement with a gear wheel or a spur gear of the transmission. The actuating element can serve to form a toothed rack drive in engagement with at least one gear wheel.

The spring device can be configured to exert and/or transmit a force such as spring force onto the first and/or second force transmission element. The spring device can be configured to exert and/or transmit a force such as spring force onto the first and/or second force transmission element, such that the first and/or second force transmission element is able to be held at least temporarily in a predetermined initial position.

The first and/or second force transmission element can be adjustable from the initial position counter to the spring force of the spring device by an adjustment path by a force exerted and/or transmitted onto the first force transmission element such as actuating force, for example the actuating force transmitted by means of the force input member. The adjustment path can be in the direction of the longitudinal axis and/or counter to the spring force of the spring device. The force transmission module can be configured to decouple the first force transmission element from the spring device after a defined and/or predetermined adjustment path and/or when a predefined and/or predetermined adjustment path is exceeded.

The first and/or second force transmission element can be adjustable in the direction of the spring force by a restoring path by the spring force of the spring device exerted and/or transmitted onto the second force transmission element. The restoring path can be in the direction of the longitudinal axis and/or in the direction of the spring force of the spring device. The force transmission module can be configured to couple the first force transmission element to the spring device, for example to couple so as to be operative and/or to couple so as to transmit force, after a defined and/or predetermined restoring path and/or when a predefined and/or predetermined restoring path is exceeded.

The first force transmission element can have at least one guide receiver for at least temporarily receiving and/or guiding a rolling body. The first force transmission element can have an inner face and an outer face in the radial direction. The at least one guide receiver of the first force transmission element can be arranged on the outer face of the first force transmission element. The at least one guide receiver of the first force transmission element can be a longitudinal guide. The at least one guide receiver of the first force transmission element can be a groove, such as a guide groove. The at least one guide receiver of the first force transmission element can be open toward a front face of the first force transmission element. The at least one guide receiver of the first force transmission element can have a stop section, for example on the side remote from the open side of the guide receiver. The stop section can be configured to act on the at least one rolling body, for example during a movement of the first force transmission element, and/or to entrain the at least one rolling body. The at least one guide receiver of the first force transmission element can be arranged and/or oriented substantially parallel to the direction of the longitudinal axis. The first force transmission element can have a plurality of guide receivers, for example two, three, four or more thereof, for at least temporarily receiving and/or guiding a rolling body. The plurality of guide receivers of the first force transmission element can be arranged spaced-apart from one another in the peripheral direction. The plurality of guide receivers of the first force transmission element can be arranged and/or oriented substantially parallel to one another and/or substantially parallel to the longitudinal axis. A rolling body can be receivable/guidable or received/guided at least temporarily in each guide receiver of the first force transmission element.

The second force transmission element can have at least one guide recess for at least temporarily receiving and/or guiding a rolling body. The at least one guide recess of the second force transmission element can be a longitudinal guide and/or longitudinal recess. The at least one guide recess of the second force transmission element can be a slot, such as a guide slot. The at least one guide recess of the second force transmission element can be open toward a front face of the second force transmission element. The at least one guide recess of the second force transmission element can have a stop section, for example on the side remote from the open side of the guide recess. The stop section can be configured to act on the at least one rolling body and/or to entrain the at least one rolling body, for example during a movement of the second force transmission element. The at least one guide recess of the second force transmission element can be arranged and/or oriented substantially parallel to the direction of the longitudinal axis. The second force transmission element can have a plurality of guide recesses, for example two, three, four or more thereof, for at least temporarily receiving and/or guiding a rolling body. The plurality of guide recesses of the second force transmission element can be arranged spaced-apart from one another in the peripheral direction. The plurality of guide recesses of the second force transmission element can be arranged and/or oriented substantially parallel to one another and/or substantially parallel to the longitudinal axis. A rolling body can be receivable/guidable or received/guided at least temporarily in each guide recess of the second force transmission element. The second force transmission element can be of claw-shaped configuration. The support section of the second force transmission element can be arranged on a side opposing the at least one guide recess of the second force transmission element.

The housing can have at least one holding recess for at least temporarily receiving and/or holding a rolling body. The housing can have an inner face and a outer face in the radial direction. The at least one holding recess of the housing can be arranged on the inner face of the housing. The at least one holding recess of the housing can be a longitudinal guide and/or longitudinal recess. The at least one holding recess of the housing can be a groove, such as a holding groove. The at least one holding recess of the housing can be open toward a front face of the housing. The at least one holding recess of the housing can have a stop section, for example on the side remote from the open side of the holding recess. The stop section can be configured to define a movement of the at least one rolling body. The at least one holding recess of the housing can be arranged and/or oriented substantially parallel to the direction of the longitudinal axis. The housing can have a plurality of holding recesses, for example two, three, four or more thereof, for at least temporarily receiving and/or guiding a rolling body. The plurality of holding recesses of the housing can be arranged spaced-apart from one another in the peripheral direction. The plurality of holding recesses of the housing can be arranged and/or oriented substantially parallel to one another and/or substantially parallel to the longitudinal axis. A rolling body can be at least temporarily receivable/guidable or received/guided in each holding recess of the housing.

The at least one guide receiver of the first force transmission element and/or the at least one guide recess of the second force transmission element and/or the at least one holding recess of the housing can be arranged and/or oriented substantially parallel to one another and/or substantially parallel to the longitudinal axis. The at least one guide receiver of the first force transmission element and/or the at least one guide recess of the second force transmission element and/or the at least one holding recess of the housing can be or are to be arranged and/or oriented in the radial direction substantially at least in some sections one behind the other.

The force transmission module can have at least one rolling body. The force transmission module can have a rolling body for each guide receiver of the first force transmission element or each guide recess of the second force transmission element/or each holding recess of the housing. For example, the force transmission module can have two, three, four or more rolling bodies. The at least one rolling body can be displaceably receivable or received at least in some sections in the at least one guide receiver of the first force transmission element and/or displaceably receivable or received in the at least one guide recess of the second force transmission element and/or receivable or received in the at least one holding recess of the housing. The at least one rolling body can be operatively received at least temporarily between the first force transmission element and the second force transmission element. The at least one rolling body can be operatively received at least temporarily between the second force transmission element and the housing. The at least one rolling body can be operatively received at least temporarily between the first force transmission element, the second force transmission element and the housing.

The second force transmission element can be couplable or coupled to the first force transmission element so as to transmit force, for example by the at least one rolling body. The at least one rolling body can be configured and/or arrangeable/displaceable such that a force such as an actuating force can be exerted and/or transmitted from the first force transmission element onto the second force transmission element. The at least one rolling body can be configured and/or arrangeable/displaceable such that a force such as spring force can be exerted and/or transmitted from the second force transmission element onto the first force transmission element. The at least one rolling body can be configured and/or arrangeable/displaceable such that a force such as spring force can be exerted and/or transmitted from the second force transmission element onto the housing. The at least one rolling body can be a rotational body, for example a ball, a cylinder, a roller, a drum, a needle, a cone or the like.

The at least one rolling body can be displaceably received in the initial position in the at least one guide receiver of the first force transmission element and/or in the at least one guide recess of the second force transmission element. The first force transmission element and/or the second force transmission element can be configured to displace the at least one rolling body at least in some sections along the adjustment path counter to the spring force of the spring device during a movement of the first force transmission element and/or second force transmission element. This movement can be substantially parallel to the longitudinal axis. When a defined and/or predetermined coupling position is reached, for decoupling the first force transmission element from the spring device the at least one rolling body can be displaced at least in some sections into the at least one holding recess of the housing. In this case, the at least one rolling body can be displaced and/or transferred from the at least one guide receiver of the first force transmission element into the holding recess of the housing. The spring device can then be couplable or coupled to the housing. The spring device can then exert and/or transmit via the second force transmission element and the at least one rolling body a force such as spring force onto the housing. In the coupling position and/or during a movement exceeding the coupling position along the adjustment path, the at least one rolling body can be held and/or clamped between the second force transmission element and the housing inside the at least one guide recess of the second force transmission element and the at least one holding recess of the housing.

The first force transmission element and/or the second force transmission element can be configured to displace the at least one rolling body at least in some sections along the restoring path in the direction of the spring force of the spring device during a movement of the first force transmission element and/or the second force transmission element. The direction of the spring force can be substantially parallel to the longitudinal axis. When a defined and/or predetermined coupling position is reached, for coupling the first force transmission element to the spring device the at least one rolling body can be displaced at least in some sections into the at least one guide receiver of the first force transmission element. In this case, the at least one rolling body can be displaced and/or transferred from the at least one holding recess of the housing into the at least one guide receiver of the first force transmission element.

A brake booster can be for a vehicle brake system and/or a vehicle. The vehicle can be a motor vehicle. The motor vehicle can be a passenger motor vehicle or truck. The brake booster can have at least one actuating unit. The actuating unit can be configured as described above and/or below. The brake booster can be an electromechanical brake booster. The brake booster can be a pneumatic brake booster. The brake booster can have a push-through unit. The push-through unit can be couplable or coupled to the at least one actuating unit.

The brake booster can have an electric motor. The brake booster can have a thrust rod. The brake booster can have a transmission and/or a transmission subassembly. The transmission and/or the transmission subassembly can be operatively arranged between the electric motor and the thrust rod. The transmission and/or the transmission subassembly can be operatively arranged between the electric motor and the actuating unit.

The brake booster can permit and/or be configured for an electrically controlled intervention in a brake actuation. The brake booster can serve and/or be configured to boost a brake pedal force. The brake booster can act in the direction of a brake pedal force. The brake booster can serve and/or be configured to actuate a brake independently of a brake pedal force. The brake booster can serve and/or be configured to attenuate a brake pedal force. The brake booster can act counter to a brake pedal force. The brake booster can serve and/or be configured to simulate a brake pedal force. The brake booster can serve and/or be configured to actuate a brake in an automated or semi-automated manner. The brake booster can permit a purely mechanical actuation of a brake by means of a brake pedal.

The brake booster can have a servo motor, for example a pneumatic servo motor. The brake booster can have an adjustable piston. The brake booster can have two adjustable pistons. The brake booster can have at least one pressure chamber. The pistons can be adjustable and/or displaceable in the pressure chamber. The pistons can be subjected or are to be subjected to a force such as a spring force by means of the spring device.

A subassembly can be for a vehicle brake system. The subassembly can have at least one brake booster. The at least one brake booster can be configured as described above and/or below. The subassembly can have at least one brake cylinder such as a brake master cylinder. The at least one brake cylinder can be fluidically couplable or coupled to at least one brake circuit of the vehicle brake system. The at least one brake booster can be couplable or coupled to the at least one brake cylinder so as to transmit force and/or serve and/or be configured to actuate the at least one brake cylinder.

The brake cylinder can be attached to the housing of the actuating unit and/or the brake booster. The brake cylinder can have a cylinder longitudinal axis. The longitudinal axis of the actuating unit and/or the actuating element of the actuating unit or the at least one tooth row section thereof can be arranged or arrangeable coaxially to the cylinder longitudinal axis. The longitudinal axis of the actuating unit and/or the actuating element of the actuating unit or the at least one tooth row section thereof can be arranged or arrangeable coaxially to the cylinder longitudinal axis in an installed position of the brake booster.

The thrust rod can have a thrust rod longitudinal axis. The thrust rod longitudinal axis and the longitudinal axis of the actuating unit and/or the actuating element of the actuating unit or the at least one tooth row section thereof can be arranged coaxially to one another. The actuating unit can be fixedly connectable to the thrust rod for transmitting a mechanical power in the extension direction of the longitudinal axis or the thrust rod longitudinal axis, in order to permit a brake actuation by means of the electric motor. A connection between the actuating unit and the thrust rod can be releasable in order to permit a brake actuation which is independent of the electric motor.

The brake cylinder can have at least one pressure piston. The at least one pressure piston can be couplable or coupled to the thrust rod. The at least one pressure piston can be displaceably received in at least one pressure chamber. At least one brake circuit of the vehicle brake system can be subjected to hydraulic brake pressure via the pressure piston. The pressure piston can be subjected to the boost power of the brake booster and/or to the actuating force generated by the driver, in order to generate the desired braking pressure on the wheel brakes connected to the brake cylinder.

The subassembly can have the transmission via which the actuating element or the at least one tooth row section can be couplable or coupled to the electric motor. The transmission can be a spur gear. The transmission can serve and/or be configured to convert a rotational movement into a linear movement. The transmission can be driven by the electric motor.

The subassembly can have the electric motor. The electric motor can be a DC motor. The electric motor can be a brushless DC motor. The electric motor can be an electronically commutated brushless DC motor. The electric motor can be synchronous motor. The electric motor can be controllable by means of an electrical control device. The electrical control device can be a control unit and/or a control apparatus. The electrical control device can have a computing device. The electrical control device can have a memory device. The electrical control device can have at least one signal input. The electrical control device can have at least one signal output.

A vehicle brake system can be for a vehicle. The vehicle brake system can have a subassembly which is configured as described above and/or below. The vehicle brake system can have a brake booster which is configured as described above and/or below.

The vehicle can be a motor vehicle. The motor vehicle can be a passenger motor vehicle or truck. The vehicle can have at least one machine for a propulsion drive. The vehicle can have at least one drivable vehicle wheel. The vehicle can have a vehicle brake system. The vehicle brake system can be configured as described above and/or below. The vehicle brake system can have at least one brake device. The at least one brake device can serve and/or be configured to brake at least one vehicle wheel. The at least one brake device can be a parking brake device. The at least one brake device can be a service brake device. The at least one brake device can be a dual-circuit or multi-circuit brake device. The at least one brake device can be a hydraulic brake device. The at least one brake device can have a brake cylinder such as a brake master cylinder. The at least one brake device can have the brake booster. The at least one brake device can be a brake pedal, a brake fluid reservoir, a brake pressure distributor, a pipe system, brake hoses, wheel brake cylinders and/or ventilation valves.

In other words, an actuating unit can be provided, such as a spring force claw unit. At least one part of the spring force can be "disabled" or deflected after a specific travel/adjustment path of the unit. To this end, a restoring spring can be implemented with a small force load. Moreover, a second spring can be placed in parallel in the unit in order to compensate for an absent force component. This spring can be placed in the unit such that it transmits its force via four elements, such as rolling bodies, for example pins, balls etc. which are arranged in slots of the rack element. The first force transmission element and/or the actuating element can form the rack element. At the start, the second spring can operate in parallel with the main restoring spring, wherein after a specific travel the four elements come into a region in which slots are provided in the main housing. When reaching these main housing slots, due to the shape of the slot base the four elements can be displaced into the slots of the main housing, and the rack element can move further to the front adjacent to the four elements. The four elements can now guide or transmit the force of the additional spring into the main housing. Thus the second spring force can no longer act on the rack element. The force is now lower. Only a certain friction can act (via the second spring by the elements and the shape of the slots of the main housing) on the lateral peripheral surface of the rack element. This remaining force can have a more or less constant force component which does not increase with further travel and can be less than the axial force of the earlier acting second spring. During the return travel of the unit the mode of operation can be reversed, wherein after reaching the slot region the additional spring force can act again on the rack element and/or assists the unit to be displaced back into the resting position.

According to the disclosure, the force of the restoring spring can be minimized or deflected. The actuating force to be applied during a push-through mode can be reduced or used for the actual braking. The deceleration of a vehicle can be facilitated and/or improved in an emergency braking situation or a functional impairment of the brake booster. The spring device can thus be "deactivated" or "released" such that the spring force thereof does not counteract or barely counteracts a braking of the vehicle. The restoring action of the spring device can be specifically "deactivated" and/or deflected. For example, in situations where the driver has to decelerate by muscular strength without the assistance of the vehicle, the deceleration is facilitated and/or improved.

BRIEF DESCRIPTION OF DRAWINGS

Exemplary arrangements of the disclosure are described in more detail hereinafter with reference to the figures, in which schematically and by way of example

DETAILED DESCRIPTION

FIGS. 1 to 5 shows schematically and in perspective an actuating unit 1 for a brake booster of a vehicle in various positions.

The actuating unit 1 comprises a housing 2 and a force transmission module 3 which is displaceably received in the housing 2. The force transmission module 3 has a first force transmission element 4, a second force transmission element 5 which is couplable or coupled to the first force transmission element 4 so as to transmit force, a spring device 6 which is couplable or coupled to the second force transmission element 5 so as to transmit force and an actuating element 7 which is couplable or coupled to the first force transmission element 4.

The spring device 6 is configured to exert a spring force on the first and/or second force transmission element 4, 5 such that the first and/or second force transmission element 4, 5 is able to be held at least temporarily in a predetermined initial position (see FIG. 2), wherein the first and/or second force transmission element 4, 5 can be adjustable from the initial position counter to the spring force of the spring device 6 by an adjustment path 8 by a force exerted and/or transmitted onto the first force transmission element 4. The force transmission module 3 is also configured to decouple the first force transmission element 4 from the spring device 6 after a defined and/or predetermined adjustment path 8 (see FIG. 5.)

Moreover, the first and/or second force transmission element 4, 5 is adjustable in the direction of the spring force by a restoring path 9 by the spring force of the spring device 6 exerted and/or transmitted onto the second force transmission element 5. The force transmission module 3 is configured to couple the first force transmission element 4 again to the spring device 6 after a defined and/or predetermined restoring path 9.

The first force transmission element 4 has at least one guide receiver 10, in this case four guide receivers 10, for at least temporarily receiving and/or guiding a rolling body 11. The guide receivers 10 are configured as guide grooves 10. The second force transmission element 5 has at least one guide recess 12, in this case four guide recesses 12, for at least temporarily receiving and/or guiding a rolling body 11. The guide recesses 12 are configured as guide slots 12. The housing 2 has at least one holding recess 13, in this case four holding recesses 13, for at least temporarily receiving and/or holding a rolling body 11. The holding recesses 13 are configured as holding grooves 13.

The first force transmission element 4 and the second force transmission element 5 are displaceable together and/or relative to one another, wherein the first force transmission element 4 is displaceably received at least in some sections inside the second force transmission element 5. The second force transmission element 5 also has a support section 14 to which the spring device 6 is couplable or coupled so as to transmit force. The support section 14 of the second force transmission element 5 is arranged on a side opposing the guide recesses 12 of the second force transmission element 5.

The force transmission module 3 has at least one rolling body 11, in this case four rolling bodies 11, which in each case are arranged and/or displaceable in some sections and/or temporarily operatively in a guide receiver 10, a guide recess 12 and a holding recess 13. The spring device 6 has a first spring 15, such as a first restoring spring 15. The displacement of the rolling bodies 11 in the direction 9 can be brought about by the spring force of the spring device 6. The displacement of the rolling bodies 11 in the direction 8 can be brought about by an actuating force exerted and/or transmitted onto the first force transmission element 4, for example an actuating force transmitted by a force input member. The force transmission module 3 and/or the first force transmission element 4 is couplable or coupled to the force input member, wherein the force input member is configured to transmit an actuating force, exerted by the driver on a brake pedal, to the force transmission module 3 and/or the first force transmission element 4.

The rolling bodies 11 are displaceably received in the initial position (see FIGS. 2 and 6) in the respective guide receiver 10 of the first force transmission element 4 and in the respective guide recess 12 of the second force transmission element 5. The first force transmission element 4 and the second force transmission element 5 are configured to be displaced counter to the spring force of the spring device 6 during a movement (in the direction 8) of the first force transmission element 4 and/or the second force transmission element 5 in order to displace the rolling bodies 11 at least in some sections along the adjustment path 8, wherein when a defined and/or predetermined coupling position (see FIG. 12) is reached, for decoupling the first force transmission element 4 from the spring device 6 the rolling bodies 11 are displaced at least in some sections in the respective holding recess 13 of the housing 2.

In the coupling position (see FIG. 12) and/or during a movement exceeding the coupling position along the adjustment path 8, the rolling bodies 11 are held and clamped between the second force transmission element 5 and the housing 2 inside the respective guide recess 12 of the second force transmission element 5 and the respective holding recess 13 of the housing 2.

The first force transmission element 4 and the second force transmission element 5 are also configured to displace the rolling bodies 11 at least in some sections along the restoring path 9, during a movement (in the direction 9) of the first force transmission element 4 and/or second force transmission element 5 in the direction of the spring force of the spring device 6, wherein when a defined and/or predetermined coupling position (see FIG. 12) is reached, for coupling the first force transmission element 4 to the spring device 6 the rolling bodies 11 are displaced at least in some sections back again into the respective guide receiver 10 of the first force transmission element 4.

Figure 1:
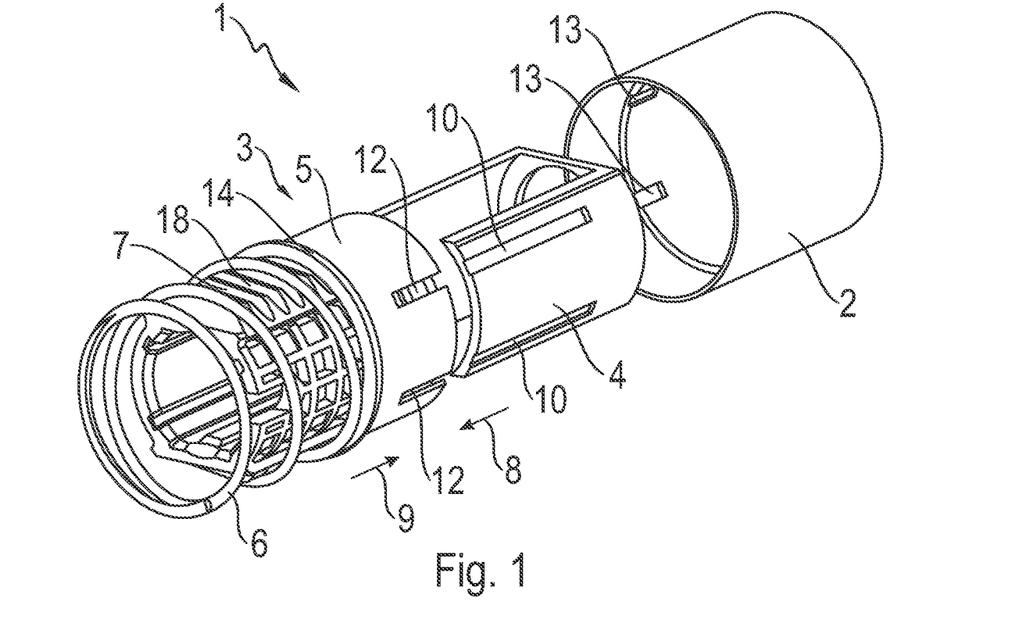
FIG. 1 shows a perspective view of an actuating unit.
Figure 2:
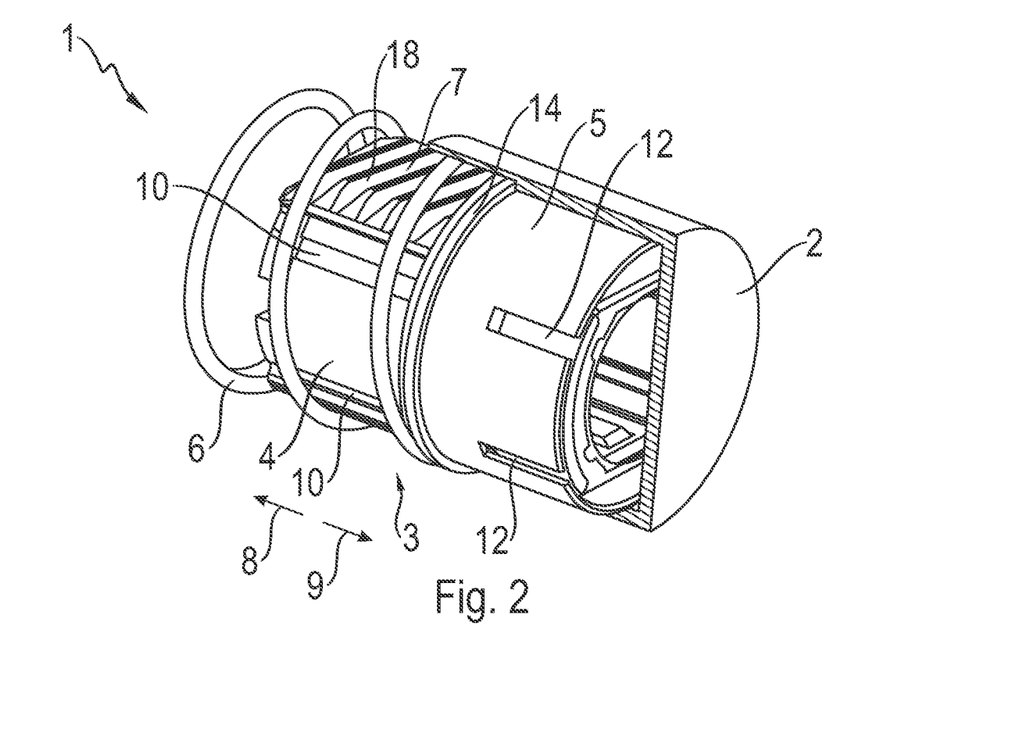
FIG. 2 shows a perspective view of the actuating unit in a first position.
Figure 3:
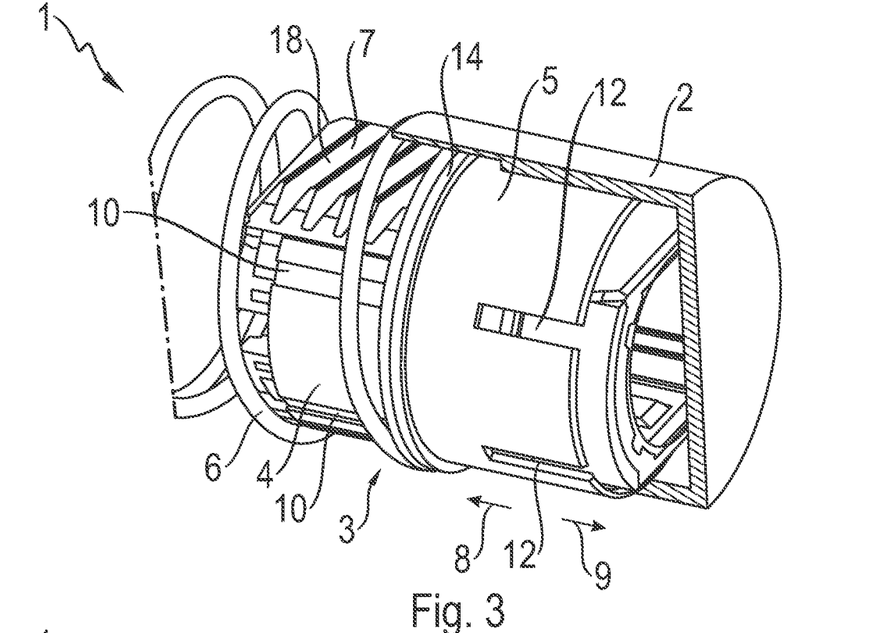
FIG. 3 shows a perspective view of the actuating unit in a second position.
Figure 4:
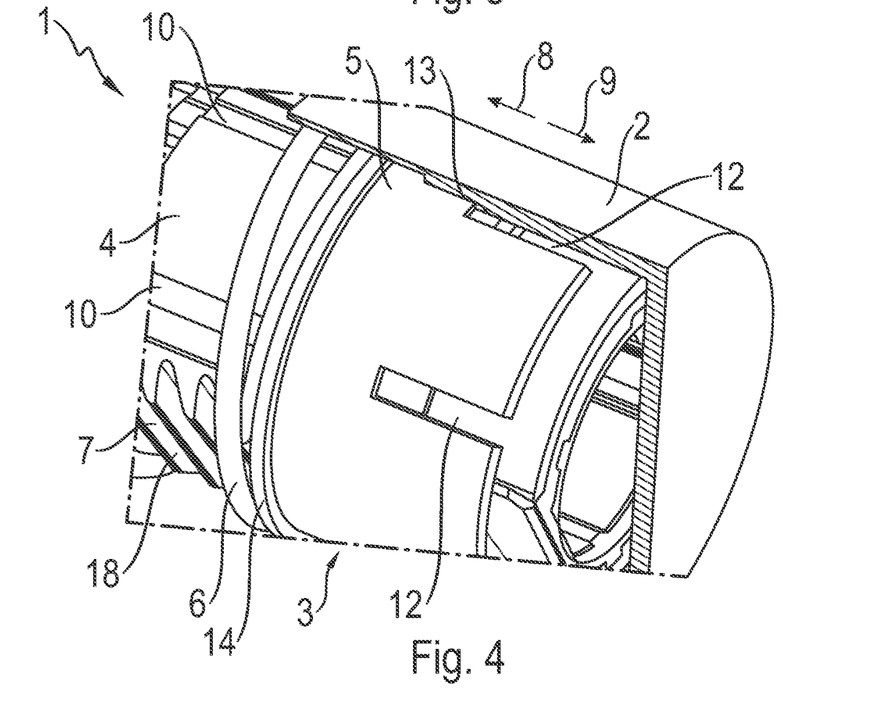
FIG. 4 shows a perspective view of the actuating unit in a third position.
Figure 5:
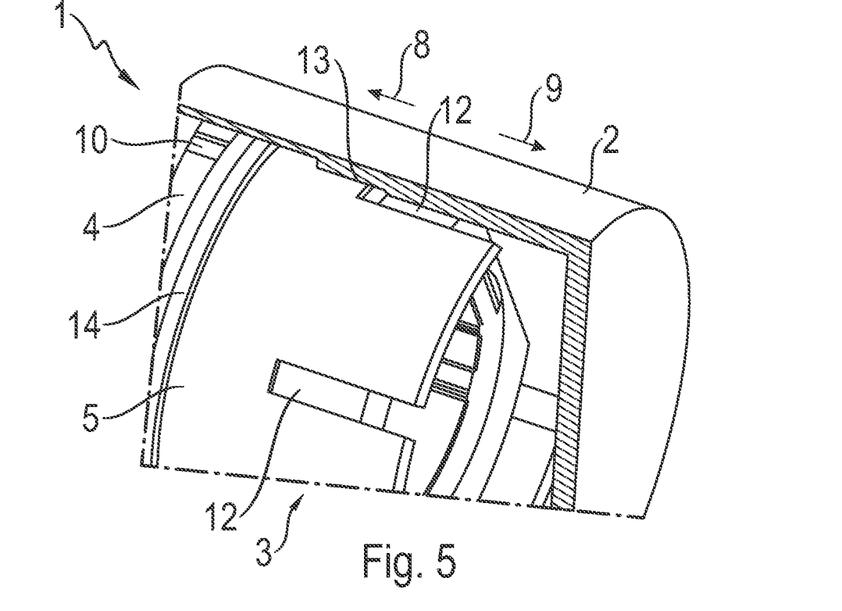
FIG. 5 shows a perspective view of the actuating unit in a fourth position.
Figure 6:
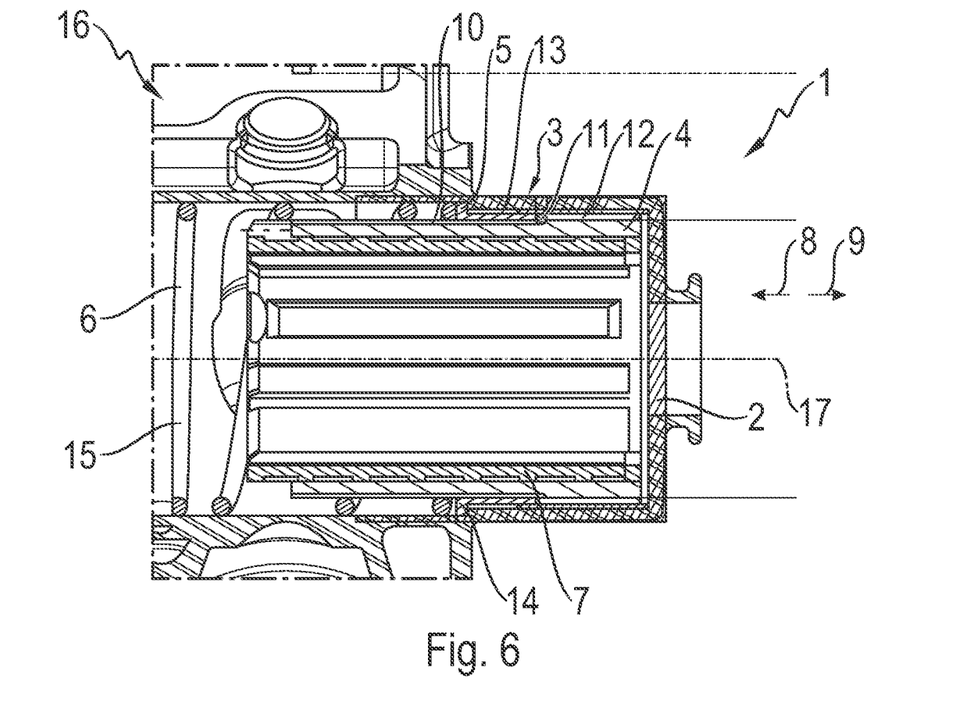
FIG. 6 shows a first sectional view of the actuating unit.

FIG. 6 shows a first sectional view of the actuating unit 1 which is arranged in a brake booster 16. The brake booster 16 is designed for use in a vehicle braking system. The actuating unit 1 has a longitudinal axis 17. The guide receivers 10 of the first force transmission element 4 and the guide recesses 12 of the second force transmission element 5 and the holding recesses 13 of the housing 2 are arranged and oriented substantially parallel to one another, wherein they extend substantially parallel to the longitudinal axis 17. They are also arranged and/or arrangeable in the radial direction, i.e. perpendicular to the longitudinal axis 17 at least in some sections and/or temporarily substantially one behind the other.

Moreover, reference is additionally made to FIGS. 1 to 5 and the accompanying description.

Figure 7:
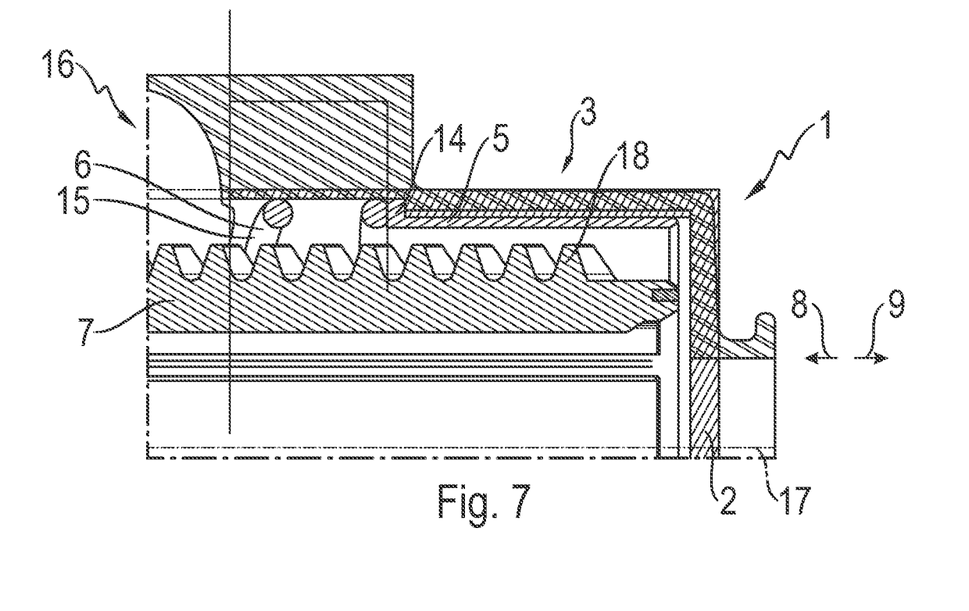
FIG. 7 shows a second sectional view of the actuating unit.

FIG. 7 shows a second sectional view of the actuating unit 1. The actuating element 7 of the actuating unit 1 is arranged at least in some sections inside the first force transmission element 4 and has at least one tooth row section 18 which is couplable or coupled via a transmission to an electric motor.

Moreover, reference is additionally made in particular to FIGS. 1 to 6 and the accompanying description.

FIGS. 8 to 12 show detailed views of the actuating unit 1, wherein the first force transmission element 4, the second force transmission element 5 and the rolling bodies 11 are shown in different positions.

Figure 8:
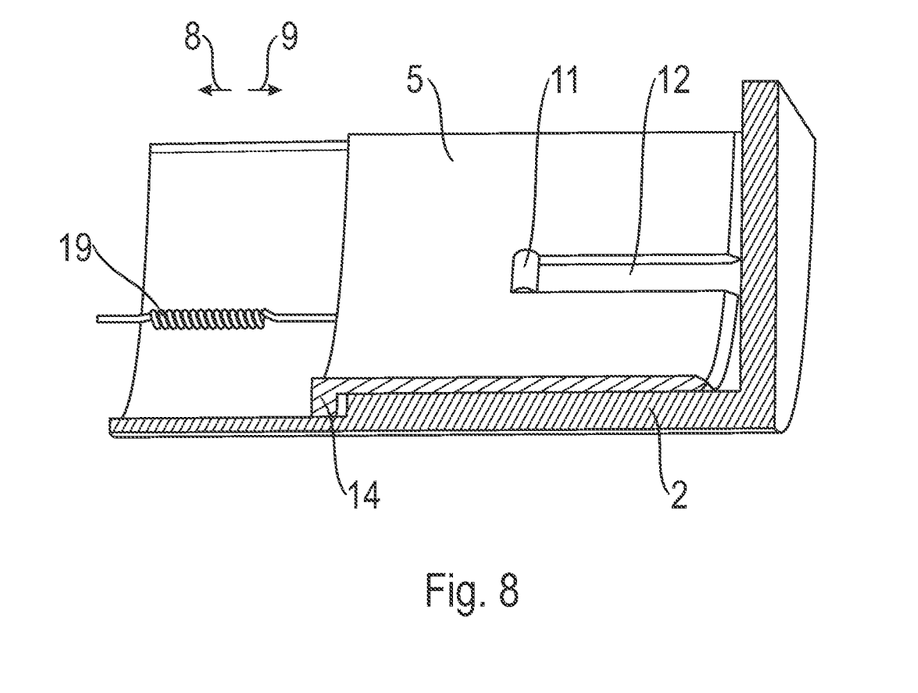
FIG. 8 shows a first detailed view of the actuating unit.
Figure 9:
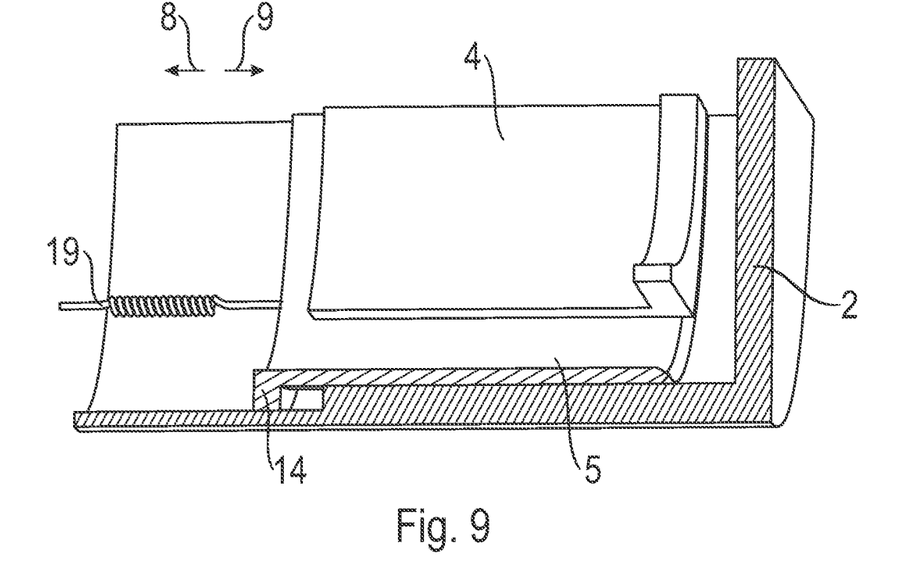
FIG. 9 shows a second detailed view of the actuating unit.
Figure 10:
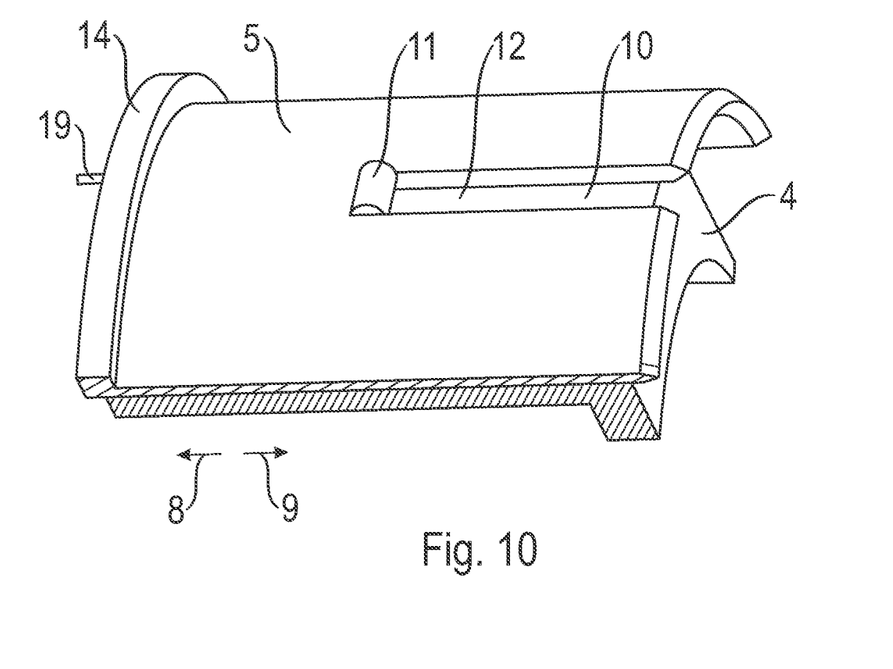
FIG. 10 shows a third detailed view of the actuating unit.
Figure 11:
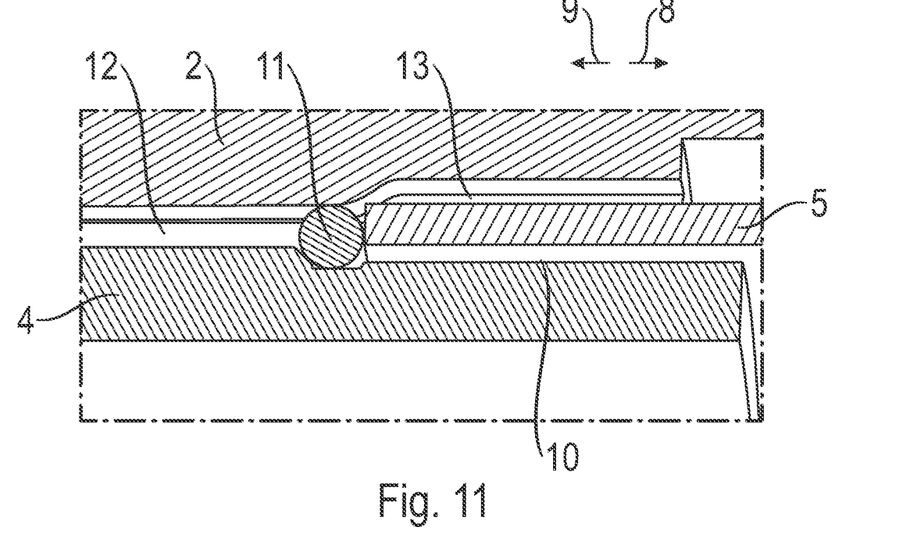
FIG. 11 shows a fourth detailed view of the actuating unit in a position.
Figure 12:
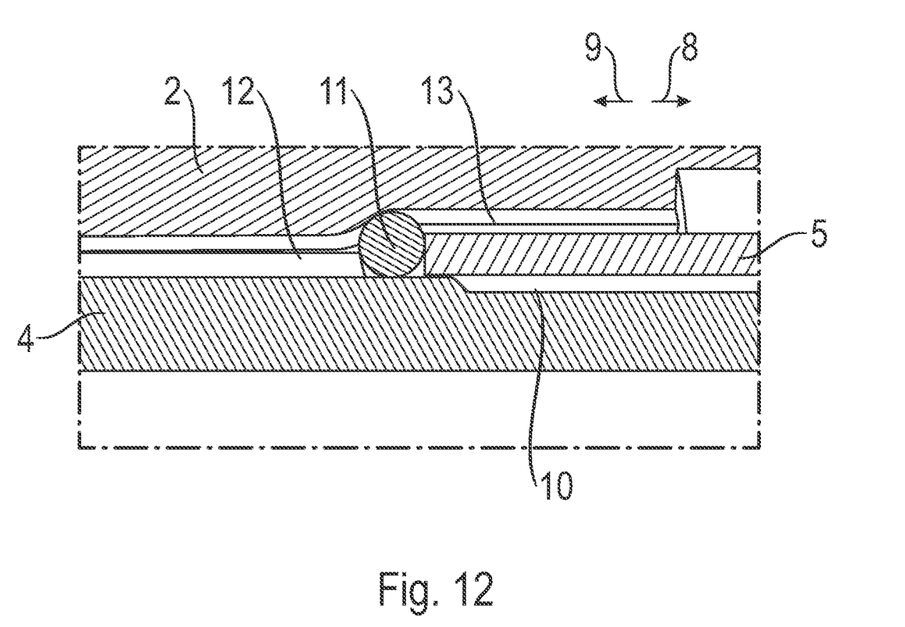
FIG. 12 shows the fourth detailed view of the actuating unit in a further position.

The spring device 6 has a second spring 19 such as a restoring spring 19 (see FIGS. 8 and 9). The second restoring spring 19 is also couplable or coupled to the second force transmission element 5. The first restoring spring 15 has a first spring force-spring path characteristic curve and the second restoring spring 19 has a second spring force-spring path characteristic curve. The first and second spring force-spring path characteristic curves can differ from one another. The first restoring spring 15 has a first spring force and the second restoring spring 19 has a second spring force. The first spring force of the first restoring spring 15 can be smaller or larger than the second spring force of the second restoring spring 19, for example with the same spring path. In FIG. 11 a position is shown in which the first force transmission element 4 is operatively coupled to the second force transmission element 5 via the rolling bodies 11 such that a spring force of the spring device 6 can be exerted and/or transmitted onto the first force transmission element 4 with a rearward movement in the direction 9 and an actuating force of the force input member can be exerted and/or transmitted onto the second force transmission element 5 with a forward movement in the direction 8. In FIG. 12 a position is shown in which the first force transmission element 4 is decoupled from the second force transmission element 5 and/or the spring device 6 such that an actuating force of the force input member can also be exerted and/or transmitted onto the first force transmission element 4 with a forward movement in the direction 8, but a spring force of the spring device 6 can no longer act on the first force transmission element 4.

Moreover, reference is additionally made in particular to FIGS. 1 to 7 and the accompanying description.

Optional features of the disclosure are denoted, for example, by "can". Accordingly, there are also developments and/or exemplary embodiments of the invention which additionally or alternatively comprise the respective feature or the respective features.

Isolated features can also be singled out from the presently disclosed combinations of features, if required, and used in conjunction with other features, by breaking up a structural and/or functional relationship potentially existing between the features in order to limit the subject matter of the claims.

The invention claimed is:

1. An actuating unit for a brake booster of a vehicle, comprising a housing and a force transmission module received displaceably in the housing, wherein the force transmission module has a first force transmission element, a second force transmission element coupled to the first force transmission element so as to transmit an actuating force, a spring device coupled to the second force transmission element so as to transmit a spring force, and an actuating element coupled to the first force transmission element, wherein the spring device is configured to exert the spring force on the first and/or second force transmission element such that the first and/or second force transmission element is able to be held at least temporarily in an initial position, wherein the first and/or second force transmission element is adjustable from the initial position counter to the spring force of the spring device by an adjustment path by a force exerted onto the first force transmission element, wherein the force transmission module is configured to decouple the first force transmission element from the spring device via rolling bodies that shift after a predetermined distance along the adjustment path.

2. The actuating unit according to claim 1, wherein the first and/or second force transmission element is adjustable in a direction of the spring force.

3. The actuating unit according to claim 1, wherein the first force transmission element has at least one guide receiver for receiving and/or guiding a rolling body.

4. The actuating unit according to claim 1, wherein the second force transmission element has at least one guide recess for receiving and/or guiding a rolling body.

5. The actuating unit according to claim 1, wherein the housing has at least one holding recess for receiving and/or holding a rolling body.

6. The actuating unit according to claim 1, wherein the first force transmission element and the second force transmission element are displaceable together and/or displaceable relative to one another and/or the first force transmission element is displaceably received at least in some sections inside the second force transmission element.

7. The actuating unit according to claim 1, wherein the force transmission module has at least one rolling body that is received in at least one of an at least one guide receiver of the first force transmission element, the at least one guide recess of the second force transmission element, at least one holding recess of the housing.

8. The actuating unit according to claim 1, wherein the at least one guide receiver of the first force transmission element and/or a at least one guide recess of the second force transmission element and/or a at least one holding recess of the housing are arranged and/or oriented substantially parallel to one another and/or substantially parallel to a longitudinal axis.

9. The actuating unit according to claim 1, wherein the at least one guide receiver of the first force transmission element is a guide groove and/or an at least one guide recess of the second force transmission element is a guide slot and/or an at least one holding recess of the housing is a holding groove.

10. The actuating unit according to claim 1, wherein the spring device is couplable or coupled to a support section of the second force transmission element so as to transmit force.

11. The actuating unit according to claim 10, wherein the support section of the second force transmission element is arranged on a side opposing the at least one guide recess of the second force transmission element.

12. The actuating unit according to claim 1, wherein the spring device has a first spring, wherein the first spring has a first spring force-spring path characteristic curve.

13. The actuating unit according to claim 1, wherein the actuating element is arranged at least in some sections inside the first force transmission element and/or has at least one tooth row section which is couplable or coupled via a transmission to an electric motor.

14. The actuating unit according to claim 1, wherein the force transmission module and/or the first force transmission element is couplable or coupled to a force input member, wherein the force input member is configured to transmit an actuating force exerted by a driver on a brake pedal to the force transmission module and/or the first force transmission element.

15. A brake booster for a vehicle brake system having at least one actuating unit according to claim 1, wherein the brake booster is at least one of an electromechanical brake booster and/or a pneumatic brake booster.

16. A subassembly for a vehicle brake system having at least one brake booster according to claim 15, and at least one brake cylinder which is fluidically couplable to at least one brake circuit of the vehicle brake system.

* * * * *